United States Patent [19]
Contreras

[11] Patent Number: 5,824,243
[45] Date of Patent: Oct. 20, 1998

[54] WATER OZONATING SYSTEM

[76] Inventor: Edward M. Contreras, 14204 Banbury Way, Tampa, Fla. 33624

[21] Appl. No.: 798,695

[22] Filed: Feb. 12, 1997

[51] Int. Cl.$^6$ ...................................................... B01F 3/04
[52] U.S. Cl. ......................... 261/36.1; 210/192; 210/760; 261/DIG. 42; 261/DIG. 75
[58] Field of Search .......................... 261/DIG. 42, 36.1, 261/DIG. 75, 76; 210/192, 760

[56] References Cited

U.S. PATENT DOCUMENTS

| | | | |
|---|---|---|---|
| 2,660,559 | 11/1953 | Prime | 210/760 |
| 2,970,821 | 2/1961 | Axt | 261/DIG. 4 |
| 3,775,314 | 11/1973 | Beitzel et al. | 261/DIG. 42 |
| 3,823,728 | 7/1974 | Burris | 210/760 |
| 4,298,467 | 11/1981 | Gartner et al. | 210/192 |
| 4,507,253 | 3/1985 | Wiesmann | 261/DIG. 42 |
| 4,555,335 | 11/1985 | Burris | 261/DIG. 42 |
| 5,075,016 | 12/1991 | Bames | 210/760 |
| 5,174,905 | 12/1992 | Shaw | 210/760 |
| 5,607,593 | 3/1997 | Cote et al. | 210/760 |

FOREIGN PATENT DOCUMENTS

| | | | |
|---|---|---|---|
| 1046363 | 10/1966 | United Kingdom | 261/DIG. 42 |

*Primary Examiner*—Richard L. Chiesa

[57] ABSTRACT

The Water Ozonating System can take several forms. Generically, the system incorporates at least the following: a water inlet means, a water storage tank, a device for introducing ozone into the water in the storage tank, and a device for dispensing water from the storage tank. A unique and particularly advantageous feature of the Water Ozonating System is that the ozonated water is kept entirely within a closed system until it is dispensed to the user. This maintains ozone in the water and in its active state (i.e., with its decontaminating and sterilizing effect). The system provides storage tank of ozone within the effluent water. This invention has many applications but not limited to the following: residential and office water purification; supermarket produce, vegetable, meat, poultry and fish, rinsing; dental operatory procedures; laboratories and commercial rinse water functions.

1 Claim, 1 Drawing Sheet

A WATER OZONATING SYSTEM
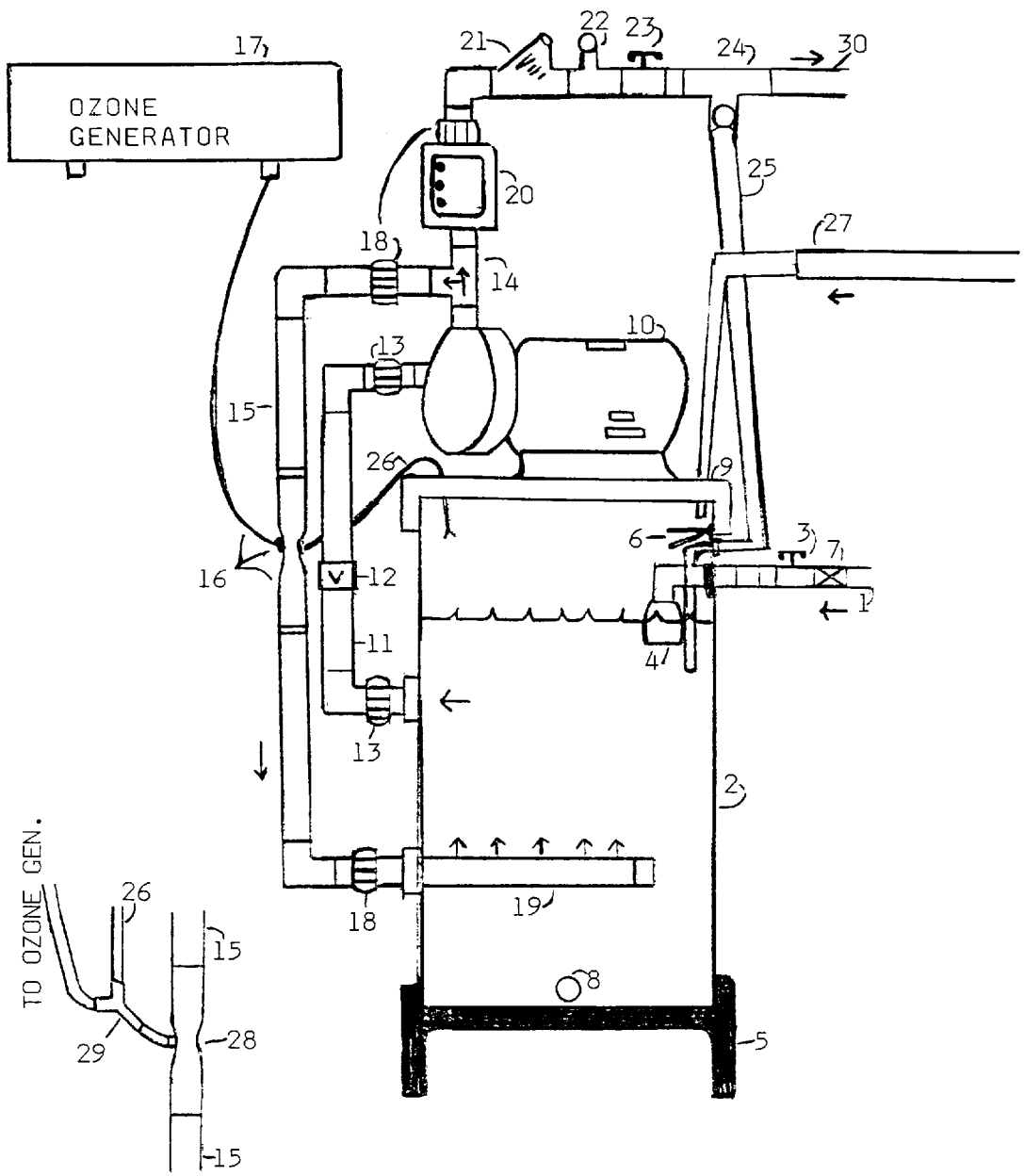
Single Port Venturi

WATER OZONATING SYSTEM

CROSS-REFERENCE TO RELATED APPLICATIONS

Not applicable

STATEMENT REGARDING FEDERALLY SPONSORED RESEARCH OR DEVELOPMENT

Not applicable

REFERENCE TO A MICROFICHE APPENDIX

Not applicable

BACKGROUND OF THE INVENTION

This invention relates to a specific method of ozonating water; whereby, the use or application there of is immediately available in its most active form. Ozone ($O_3^-$) is a gas that is formed when the oxygen in our air is exposed to high intensity ultraviolet light, such as our sun creating the ozone layer around the earth. It is also produced by electrical discharge such as lighting or corona discharge and "UV" Irradiation. Ozone is a powerful oxidizer, deodorizer and disinfectant. Used properly, it is a safe and highly effective alternative to traditional chemical water treatment systems, with many benefits. Air is the oxygen source for generating ozone. Ozone is a true sterilant. It is a colorless gas which is formed in low concentrations from oxygen. It completely destroys not only bacteria, but also viruses, spores, and cysts, while at the same time removes dissolved organic materials by oxidation. The half-life of ozone in water is approximately twenty minutes, thereby imparting a residual sterilization capability to prevent recontamination. The ozone molecule oxidizes microorganisms directly without prior hydrolysis as is the case with some chemicals. Ozone kills bacteria by rupturing its cellular membrane. This process, known as cell lysing, disperses the bacterial cytoplasm in the water, making reactivation and regrowth impossible. The unique sterilizing capabilities of ozone are attributed to the fact that it is the second most powerful oxidant known; only fluorine exceeds it. After ozone has lysed a microorganism, the dispersed cytoplasm then contributes to the nonviable total organic carbon content of the water. While ozone is destroying microorganism, it is simultaneously oxidizing other dissolved organic matter. Our invention capitalizes upon the significance of producing and retaining ozonated water in its active (residual) state for immediate delivery to the user. This is accomplished by a self contained system which incorporates at least the following: a water inlet means, a water storage tank, a means for introducing ozone into the water in the storage tank, and a means for dispensing the active ozonated water from the storage tank.

Other methods of treating water or liquids with ozone is to inject ozone by various means into a stream of water or by use of a contact chamber which ozonates a percentage (usually, 10 to 20%) of the main stream of water. The above mentioned methods will treat water; however our invention not only treats the water but also provides for residual capability to decontaminate and sterilize effectively at the point of use.

BRIEF SUMMARY OF THE INVENTION

The object of this invention is to provide a water ozonating system by which it exploits optimum capabities of the water treatment and substained effectiveness at the point of use. A unique and particularly advantageous feature of the water ozonating system is that the ozonated water is kept entirely within a closed system until it is dispensed to the user. It maintains ozone in the water in its active state(i.e. with its decontaminating and sterilizing effect). This system provides a reservoir of ozonated water that retains a disinfecting concentration of ozone within the effluent water. Another unique and advantageous feature of the invention is that the ozonating means is structured in such a way that the water in the tank is either periodically or continuously ozonated. This ensures that the water within the storage tank is perpetually ozonated and maintains high concentrations of ozone in its active state throughout storage. Furthermore, the system, by ozonating water in a closed, single storage tank, maintains a large volume of ozonated water for use on demand. This avoids the prospect that the ozonated water will be consumed more rapidly than it can be ozonated and purified. One preferred embodiment of the invention involves a system wherein the ozonated water is continuously circulated throughout the system. More particularly, ozonated water is cirfrom the storage tank through the dispensing system to a point directly anterior to the tap, and back through the storage tank. This circulation of ozonated water eliminates any dead volume between the ozonating mechanism and the tap. Consequently, this embodiment of the ozonating system will provide actively ozonated water virtually instantaneously with the initial flow from the tap. Moreover, the use of a suitable reservoir ensures that the water has been thoroughly ozonated for a period of time sufficient to decontaminate and sterilize the water.

BRIEF DESCRIPTION OF THE DRAWING

The invention is explained in more detail below by reference to an illustration embodiment shown in the single drawing.

DETAILED DESCRIPTION OF THE INVENTION

A unique design which provides ozonated water in its active residual state before ozone reverts back to oxygen. When the ozone is injected into the water it has a short half-life of approx. 20 minutes during which time it has the ability to destroy various water borne bacteria, viruses, spores and cysts while at the same time removes dissolved organic materials by oxidation.

This is achieved by continuously injecting ozone at low concentration levels and recirculating the same water until the desired amount of water is used. The recirculating flow rate is provided by a pump which is sized in relationship to the amount of water contained in a reservoir having a complete turn every minute while the system is operating. When any amount of active-ozonated water is used; the system provides for automatic replenishment of fresh water. This (new) fresh water then becomes actively ozonated within one minute.

The water ozonating system is positioned at any location of incoming water so that it can be connected to the inlet port 1 of the storage tank 2 preferably non-pressurized. Also at this water entry line is a ball valve 3 to control water flow and the capability for complete shut-off during maintenance period. At the end of the incoming water line is a float-valve 4 to regulate the water level in the storage tank 2. This float-valve 4 will shut off incoming water once it reaches the maximum water level. Conversely, the float-valve 4 will open as the ozonated water is used to refill the storage tank 2 back to its proper water level.

It is highly desirable that the storage tank 2 sit on a mounting stand 5 or built into a enclosure appropriately 6" inches off the ground. An overflow safety switch 6 is mounted above the float-valve 4 to prevent the storage tank 2 from spilling over into the environment. A solenoid valve 7 will shut the incoming water into the storage tank 2 when activated by the overflow safety switch 6. A drain port 8 is provided for cleaning/draining the storage tank 2. A removable lid 9 is also provided for service maintenance of components within the storage tank 2.

A self-priming pump/motor 10 is mounted upon the removable lid 9. The pump/motor 10 capability is in direct relationship to the total water capacity in the storage tank 2. Example, a 30 gallon capacity storage tank 2 would have a 30 G.P.M. (Gallon Per Minute) water flow pump/motor 10 capability. This pump/motor 10 design configuration is not limited to the above; it can also be positioned inside the storage tank 2 with a submersible pump or a pump/motor 10 mounted outside of the storage tank 2 near the mounting stand 5. It is important to note that the design relationships must remain the same. Upon operation of the pump/motor 10 water is drawn into the suction side of the pump through a water line which is connected to the storage tank 2. This water line will contain a check valve 12 to prevent loss of prime to the pump/motor 10. This water line 11 will have two unions 13 for quick disconnect and service to the pump/motor 10. At the discharge line from the pump/motor 10 a tee 14 is positioned to allow water to flow when needed upon demand and simultaneously recirculate water back to the storage tank 2 via a water line 15 connecting the tee 14 and the storage tank 2. Example, when demand requires 10 G.P.M.'s the pump/motor 10 will satisfy that demand and at the same time recirculate 20 G.P.M.'s. During this total function both actions receive ozonated water in its residual state.

Connected to the water line 15 is a dual port venturi/check valve and tubing 16 which is used to draw and mix ozone from an ozonator 17 into the recirculating water. For low rates a single port venturi would be used. This ozonator 17 can be either corona discharge or Ultraviolet light types. Also connected to the water line 15 are unions 18 for quick disconnect and servicing to the system. Attached to the end of water line 15 and mounted inside the storage tank 2 is a diffuser 19 to aid in the mass transfer of ozone into the storage tank 2. The diffuser 19 is made with a series of pin like holes to allow even distribution of the ozone water mix.

Mounted above tee 14 is a water flow sensor 20 to activate (turn on and off) the pump/motor 10 upon demand. Next is a pressure regulator 21 to set the demand line pressure. Following is a pressure gauge 22 to indicate line pressure in P.S.I. measurement. Then a ball valve 23 is positioned to shut off for servicing the system. Next is a safety pressure relief valve 24 to override any potential excess pressure on the line with a discharge hose 25 feeding back to the storage tank 2.

A preferred embodiment of the invention involves a water line 27 wherein the ozonated water is continuously circulated throughout the system. More particularly, ozonated water is circulated from the storage tank through the dispensing system to a point directly anterior to the tap, and back through the storage tank. This circulation of ozonated water eliminates any dead volume between the ozonating mechanism and the tap. Consequently, this embodiment of the ozonating system will provide actively ozonated water virtually instantaneously with the initial flow of water from the tap. Moreover, the use of a suitable reservoir ensures that the water has been thoroughly ozonated, and ozonated for a period of time sufficient to decontaminate and sterilize the water. Provisions to handle any ozone off gas is provided by utilizing the venturi 16 with a flexible tube 26 connected from the other suction port and feed into the storage tank 2 so that the hose is positioned near the bottom of the lid 9 to capture and reuse any excess ozone, thus leaving no waste. For low flow rates a single port venturi 28 with a "Y" 29 connection will be used with one tubing connected to the ozonator 17 and the other to reuse the off gas from the storage tank 2. Finally, 30 identifies the out going water line which is connected to the main service line serving all user points.

I claim:

1. A water ozonating system for maintaining ozone in the water in its active state comprising a storage tank having a removable lid, a water inlet to said tank comprising a ball valve for controlling water flow, a float valve for regulating a water level in said tank, and a solenoid valve for shutting off incoming water, said tank having an overflow safety switch mounted above said float valve for activating said solenoid valve to prevent water from spilling over into the surrounding environment, said tank further having a self-priming pump/motor with a suction side connected to said tank through a first water line containing a check valve for preventing loss of prime to said pump/motor and two unions for quick disconnect and servicing to said pump/motor, said pump/motor having a discharge line with a tee for simultaneously allowing water to flow when needed upon demand and recirculating water back to said tank through a second water line connecting said tee and said storage tank, said second water line comprising a venturi/check valve and tubing for drawing ozone, said ozonating system further comprising an ozone generator for supplying ozone to said venturi/check valve and tubing, a tube connected between said venturi/check valve and said tank for collecting excess ozone in said tank and supplying said excess ozone to said venturi/check valve, said second water line also comprising unions for quick disconnect and servicing to said system and a diffuser having pin holes attached to the end of said second water line and positioned inside said tank for allowing even distribution of ozonated water, said ozonating system also comprising mounted above and connected to said tee a water flow sensor for activating said pump/motor upon demand, a pressure regulator for setting the demand line pressure, a pressure gauge for indicating said line pressure, another ball valve for shutting off service to said system, a pressure relief valve for overriding any potential excess pressure, and a discharge hose for feeding back water to said tank.

* * * * *